May 27, 1924.
C. C. FARMER
1,495,384
TRIPLE VALVE DEVICE
Filed June 18, 1923      2 Sheets—Sheet 1
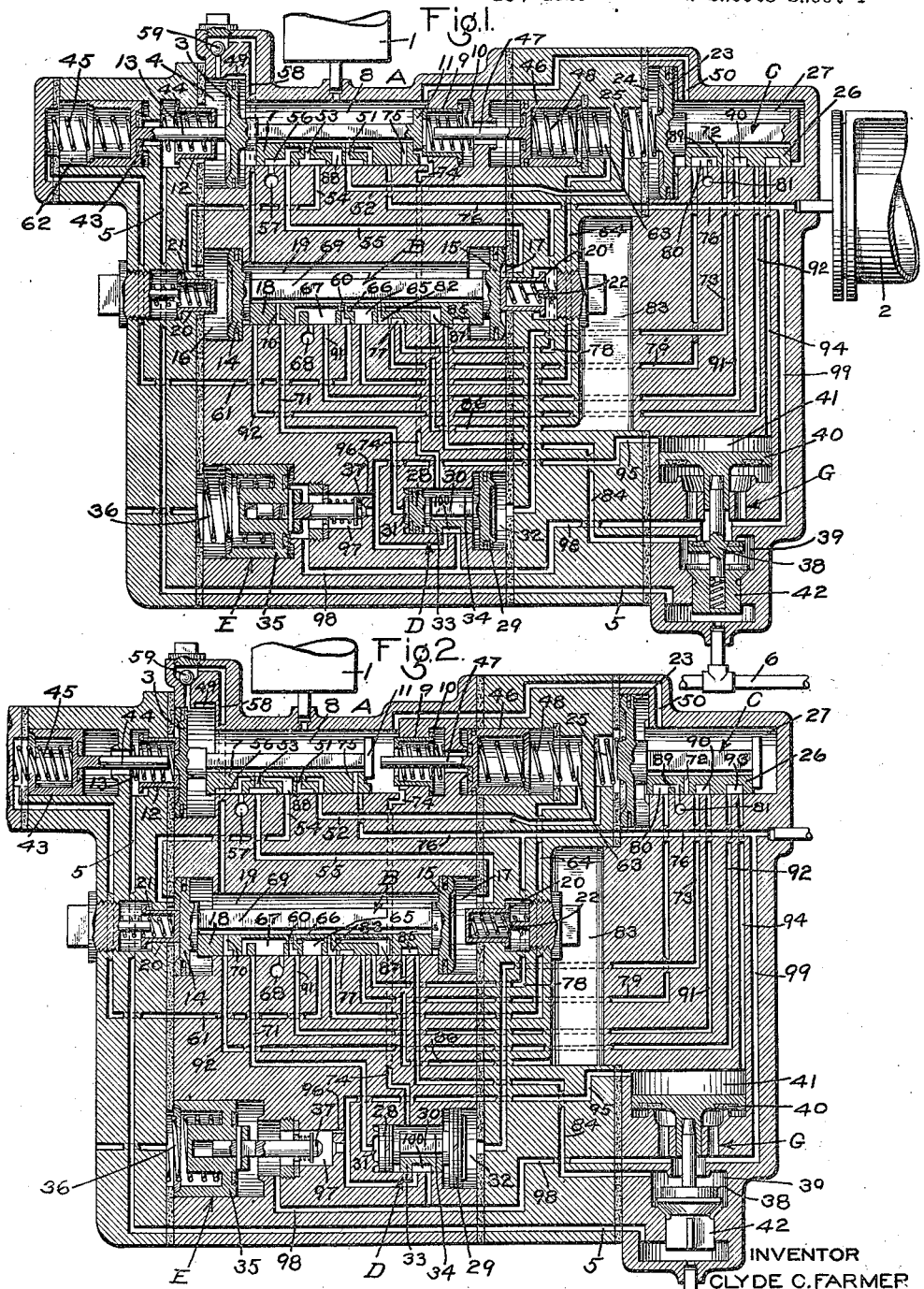
INVENTOR
CLYDE C. FARMER
BY 
ATTORNEY May 27, 1924.
C. C. FARMER
TRIPLE VALVE DEVICE
Filed June 18, 1923
1,495,384
2 Sheets-Sheet 2
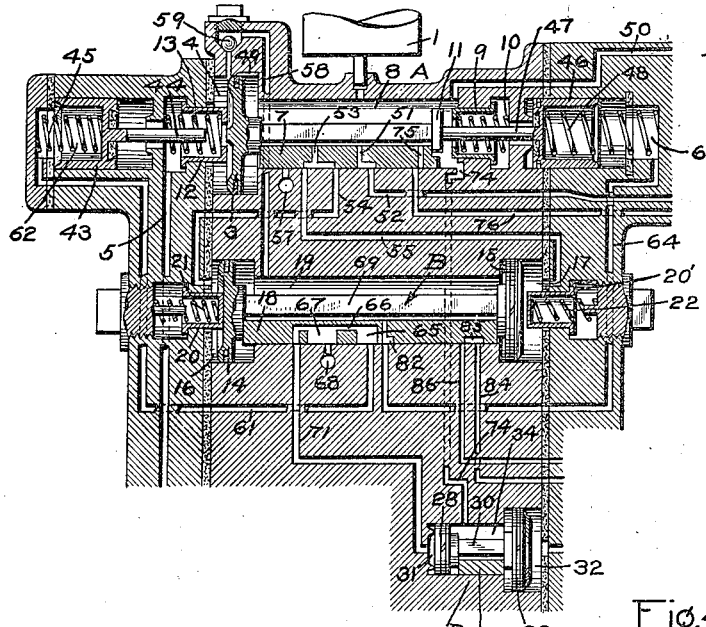
Fig.3.
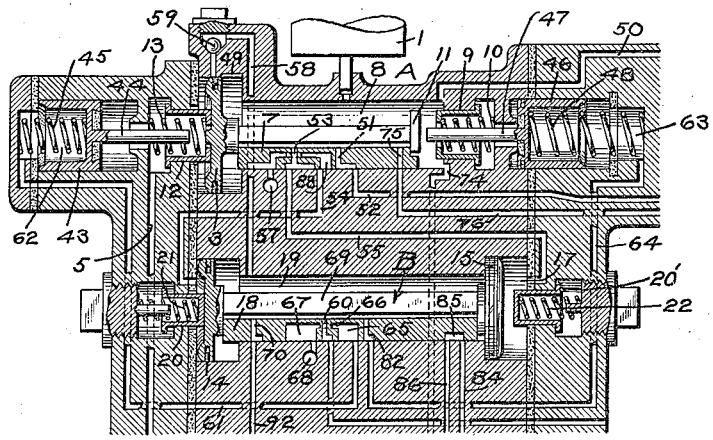
Fig.4.
INVENTOR
CLYDE C. FARMER
BY *Wm. M. Cady*
ATTORNEY Patented May 27, 1924.

1,495,384

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

TRIPLE-VALVE DEVICE.

Application filed June 18, 1923. Serial No. 645,963.

*To all whom it may concern:*

Be it known that I, CLYDE C. FARMER, a citizen of the United States, residing at Pittsburgh, in the county of Allegheny and State of Pennsylvania, have invented new and useful Improvements in Triple-Valve Devices, of which the following is a specification.

This invention relates to fluid pressure brakes, and more particularly to an automatic valve device for controlling the application and release of the brakes.

With the usual standard triple or equalizing valve device, the friction of the main slide valve on its seat is relied on to prevent possible movement of the parts to emergency position when a gradual reduction in brake pipe pressure is made with the intention of effecting a service application of the brakes, and a graduating valve, having a movement relative to the main valve, is provided, so that when the auxiliary reservoir pressure has been reduced in a service application of the brakes by flow to the brake cylinder to a point slightly less than the reduced brake pipe pressure, the service port is lapped by a relative movement of the piston and the graduating valve, the main valve again providing a resistance means to prevent movement of the parts to release position.

It has been found difficult to ensure that the main slide valve will in every case offer the desired fixed resistance to movement, so as to positively prevent undesired movement of the parts.

One object of my invention is to provide an improved equalizing valve device in which the above difficulty is overcome and for this purpose I propose to employ a main slide valve which also serves as the graduating valve and in which the resistance to movement is reduced to a minimum and then employ an external resistance device for opposing the movement of the main slide valve to application position with a substantially fixed or constant resistance, sufficient to ensure that the parts will not move to emergency position when a gradual service reduction in brake pipe pressure is made. In order to prevent movement of the equalizing valve parts from service lap position toward release position, an external release resistance device is provided.

Another object of my invention is to provide improved means for obtaining a more uniform rise in pressure in the brake cylinder in an emergency application of the brakes.

Other objects and advantages will appear in the following more detailed description of the invention.

In the accompanying drawings; Fig. 1 is a diagrammatic sectional view of an automatic brake controlling valve mechanism embodying my invention and showing the parts in full release position; Fig. 2 a similar view, showing the parts in emergency application position; Fig. 3 a similar view, omitting certain parts, and showing the parts in service lap position; and Fig. 4 a view similar to Fig. 3, showing the parts in service application position.

As shown in the drawings, the construction may comprise an equalizing valve device A for controlling the supply of fluid under pressure from the auxiliary reservoir 1 to the brake cylinder 2 and for also operating as a pilot valve device, a relay valve device B for controlling the release of fluid from the brake cylinder and the quick service feature of the triple valve device, the movement of which is controlled by the valve mechanism A, a selector valve device C for controlling the retarded release and communication through which fluid is supplied from the auxiliary reservoir to the brake cylinder in an emergency application of the brakes and adapted to be controlled by the equalizing valve device A, a by-pass valve device D for retarding the build up of pressure in the brake cylinder if the triple or equalizing valve device is located at the front portion of the train and for permitting a quick build up of pressure in the brake cylinder if the triple valve device is located at the rear portion of the train, a hold back timing valve device E, and an emergency valve mechanism G.

The equalizing valve device A may comprise a piston 3, contained in piston chamber 4, which is connected by a passage 5 to the brake pipe 6 and a main slide valve 7, adapted to be operated by piston 3 and contained in valve chamber 8, which is connected to the auxiliary reservoir 1. A retarded release stop 9, subject to the pressure of a spring 10, engages the piston stem 11 in full release position of the main valve 7, so that the spring 10 resists movement of the main valve to its inner retarded release position.

A service or graduating stop 12, subject to the pressure of spring 13, engages the piston 3 in service application position of the main slide valve.

The relay valve device B may comprise pistons 14 and 15, connected by piston stem 69, and contained in the respective piston chambers 16 and 17, and a slide valve 18, contained in valve chamber 19 and operable by the movement of pistons 14 and 15. A service lap stop 20 subject to the pressure of spring 21, tends to move the piston 14 from service to service lap position and a release lap stop 20′, subject to the pressure of spring 22 tends to move piston 15 from release position to release lap position.

The selector valve device C may comprise a piston 23 contained in piston chamber 24 and subject to the pressure of spring 25, and a slide valve 26 operable by said piston and contained in valve chamber 27.

The by-pass valve device D may comprise differential pistons 28 and 29, connected by a piston stem 20 and contained in the respective piston chambers 31 and 32, and a slide valve 33, operable by said pistons, and contained in valve chamber 34 intermediate the pistons 28 and 29.

The hold-back and timing valve device E may comprise a valve piston 35, subject to the pressure of a spring 36, and a valve 37 operable by the movement of said valve piston.

The emergency valve mechanism G may comprise an emergency vent valve 38 contained in valve chamber 39, a piston 40, contained in piston chamber 41, and adapted to operate said valve, and an emergency check valve 42 for controlling communication from the brake pipe 6 to valve chamber 39.

For yieldingly resisting movement of the main valve mechanism from release position toward service application position, an application resistance piston 43 is provided, said piston having a stem 44 adapted to engage the main piston 3 when in its full release position and subject to the pressure of a spring 45. For yieldingly resisting movement of the main valve mechanism from service lap position toward release position, a release resistance piston 46 is provided, said piston having a stem 47 adapted to engage the main piston stem 11 in service lap position of the main slide valve, and being subject to the pressure of a spring 48.

In operation, when the brake system is being charged with fluid under pressure, fluid flows from the brake pipe 6 and unseats emergency check valve 42 so as to charge the valve chamber 39 with fluid under pressure, the pressure in said chamber then holding the vent valve 38 seated. Fluid from the brake pipe 6 flows through passage 5 to piston chamber 4 and thence through the usual feed groove 49 around piston 3 to charge valve chamber 8 and the auxiliary reservoir 1. Fluid is supplied from valve chamber 8, through passage 50 to selector valve chamber 27 and with the main slide valve 7 in full release position, fluid is supplied from valve chamber 8 through port 51 in slide valve 7 and passage 52 to selector piston chamber 24. The fluid pressures upon opposite sides of selector piston 23 being thus equalized at this time, the spring 25 maintains the selector valve device in its right hand position.

Fluid also flows from valve chamber 8 through port 53 in main slide valve 7 and passage 54 to relay piston chamber 16, causing the relay valve device to be moved to its extreme right hand or release position, since piston chamber 17 is now connected to the atmosphere through passage 55, cavity 56 in main slide valve 7, and exhaust port 57. The relay slide valve chamber 19 is charged with fluid under pressure from the piston chamber 4 and the brake pipe, by way of passage 58, containing a non-return check valve 59.

With the relay slide valve 18 in its release position, fluid under pressure is supplied from valve chamber 19, through port 60 in relay slide valve 18 and passage 61 to spring chamber 62 of the application resistance piston 43. The fluid pressures on opposite sides of piston 43 are thus balanced at this time, since the opposite side of the piston is open to brake pipe pressure, and consequently the force of spring 45 is effective through stem 44 to yieldingly resist movement of piston 3 from release position toward application position.

In release position of relay slide valve 18, fluid is vented from spring chamber 63 of the release resistance piston 46 through passage 64, cavity 65 in relay slide valve 18, connecting port 66, and cavity 67 which is connected to exhaust port 68. The opposite face of the release resistance piston being subject to fluid pressure in valve chamber 8, the resistance piston will be held in its extreme right hand position, compressing spring 48.

The piston chamber 31 of the small piston head 28 of the by-pass valve device D is charged with fluid under pressure from valve chamber 19, through port 70 in relay slide valve 18 and passage 71 and piston chamber 32 of the large piston 29 is charged from valve chamber 27 of selector valve device C through port 72 in slide valve 26 and passage 73, and since the valve chamber 34 is at all times in communication with valve chamber 8 and the auxiliary reservoir through passage 74, the fluid pressures are equalized on all sides of the bypass valve device D, so that said valve device will remain in the position it happens to be at this time.

If it is desired to effect a service application of the brakes, a gradual reduction in brake pipe pressure is made and when the brake pipe pressure has been reduced sufficiently below the auxiliary reservoir pressure to overcome the resistance of the spring 45, the main piston 3 will move to the left until the piston engages the yielding stop 12. The main slide valve 7 is thus moved to service application position, in which fluid is supplied to the brake cylinder 2 from valve chamber 8, through port 75 and passage 76.

During the movement of slide valve 7 and before the piston 3 engages the stop 12, port 53 commences to register with passage 55, so that fluid under pressure is supplied from valve chamber 8 to piston chamber 17, through port 53 and passage 55. At the same time, cavity 56 in slide valve 7 connects passage 54 with exhaust port 57 so that piston chamber 16 is vented to the atmosphere. The above changes in fluid pressures on the pistons 14 and 15 result in the movement of the relay valve device B to its extreme left hand position, compressing the spring 21. In this position, the brake cylinder exhaust is closed, since the movement of slide valve 18 disconnects cavity 77 from passages 78 and 79, it being noted that in the release position of slide valve 18, the brake cylinder 2 is open to the exhaust through passage 76, passage 78, cavity 77, passage 79, cavity 80 in selector slide valve 26 and exhaust port 81.

In service position of relay slide valve 18, piston chamber 63 of the release resistance piston 46 is supplied with fluid under pressure from valve chamber 19 through port 82 and passage 64 so that the fluid pressures on opposite sides of the piston 46 being equalized, the spring 48 moves said piston to its extreme left hand position.

In order to produce a quick service venting of fluid from the brake pipe, the relay slide valve 18 in service position connects the brake pipe with a reduction chamber 83, by way of valve chamber 39, passage 84, cavity 85 in slide valve 18, and passage 86, it being noted that in release position of slide valve 18, the reduction reservoir 83 is maintained at atmospheric pressure, since said reservoir is connected to exhaust port 68 through passage 86 and cavity 87, which cavity communicates through an extension passage with cavity 65. In service application position of the relay valve device B, the piston chamber 62 of the application resistance piston 43 is vented to the atmosphere through passage 61, cavities 65 and 67 in slide valve 18 and exhaust port 68, so that the resistance piston 43 will be shifted to its extreme left hand position, where it exerts no influence on the movement of piston 3.

When the auxiliary reservoir pressure has been reduced by flow to the brake cylinder to a point slightly less than the reduced brake pipe pressure, the piston 3 will move to the right until communication from port 75 to passage 76 is closed. In this position, which is the service lap position, the piston stem 11 engages the release resistance stem 47 which then serves as a positive stop to prevent further movement of the piston 3 toward release position.

In service lap position of slide valve 7, piston chamber 16 is supplied with fluid under pressure from valve chamber 8 through port 53 and passage 54 and the fluid pressures being thus equalized on both pistons 14 and 15, the spring 21, which is under compression, will exert its force to move the relay valve to service lap position, as shown in Fig. 3.

In service lap position, slide valve 18 closes communication through cavity 85 from the brake pipe to the reduction chamber 83, and also in this position the piston chamber 31 of the small by-pass piston 28 is connected to the exhaust through passage 71, cavity 67 in slide valve 18, and exhaust port 68, so that the by-pass valve device D will be shifted to its cut-in position at the extreme left.

If it is desired to release the brakes, the brake pipe pressure is increased so as to shift the main piston 3 toward release position and if the triple valve device happens to be located at the rear of the train, the rate of increase in brake pipe pressure will only move the piston 3 to full release position, in which the piston stem 11 engages the retarded release stem 9. In this full release position, the piston chamber 17 of the relay piston 15 is connected to exhaust port 68 through passage 55 and cavity 56 in slide valve 7 and at the same time, piston chamber 16 of relay piston 14 is supplied with fluid from valve chamber 8 through port 53 and passage 54. This results in the movement of the relay valve device B to the extreme right, compressing the spring 22, as shown in Fig. 1. The initial movement of slide valve 18 toward the right operates to connect the piston chamber 63 to the atmospheric exhaust port 68 through passage 64, cavity 65, and connected cavity 67, so that the fluid pressure acting on the opposite face of the resistance piston 46 operates to shift said piston to its extreme right hand position and thus relieve the main piston 3 from further resistance to movement in the release direction. Upon full travel of relay slide valve 18 to the right, the brake cylinder 2 is connected to exhaust port 87 through passage 76, passage 78, cavity 77, passage 79, and cavity 80 in selector slide valve 26. At the same time the reduction chamber 83 is connected to the exhaust port 68 through passage 86, and cavities 87, 65, and 67 of slide valve 18.

If the triple valve should be located at the front part of the train, where the rise in brake pipe pressure will be rapid during the release period, the piston 3 and slide valve 7 will be moved to the extreme right, or retarded release position, instead of full release position, compressing the retarded release spring 10. In the retarded release position of the main valve 7, the piston chamber 24 of the selector valve device C will be connected to the atmosphere through passage 52, cavity 88, which communicates with cavity 56, and exhaust port 57. The selector piston 23 is thereupon shifted to its extreme left, in which passage 79 is connected to exhaust port 81 through a restricted port 89. It will thus be seen that on cars at the head end of the train, the release of fluid from the brake cylinder will be slow, while the release of fluid from the brake cylinder on cars at the rear of the train will be more rapid.

The movement of the selector valve device C to the retarded release position is utilized to control the position of the by-pass valve device D, so that at the head end of the train the by-pass valve device is moved to its cut-out position in which the supply of fluid from the auxiliary reservoir to the brake cylinder in an emergency application of the the brakes is retarded, so as to permit only a slow build up of pressure in the brake cylinders at the head end of the train.

For this purpose, in the retarded release position of the selector valve device C, the piston chamber 32 of the by-pass valve device is connected to the atmosphere through passage 73, cavity 90 in selector slide valve 26, passage 91, cavity 67 in relay slide valve 18, and exhaust port 68. The by-pass valve device D will then be shifted to its right hand position and if an emergency application of the brakes is made with the by-pass valve device in the above position, the following action will take place.

The main piston 3 will be shifted to emergency position, as shown in Fig. 2, in which fluid is supplied from the auxiliary reservoir instead of the brake pipe through passage 58, past the check valve 59 to valve chamber 19. From valve chamber 19, fluid is supplied to the brake cylinder through port 70 in slide valve 18, passage 92, cavity 93 in selector slide valve 26, passage 94, through emergency piston chamber 41, passage 95, restricted port 96, valve chamber 97, passage 98, and thence through passage 99 to the brake cylinder 2. It will thus be seen that on cars at the head end of the train, the brake cylinder pressure will at first be built up slowly, due to the fact that the supply of fluid from the auxiliary reservoir to the brake cylinder is limited to the capacity of the restricted port 96. When, however, the brake cylinder pressure has been increased to a predetermined degree, said pressure, acting on the right hand face of hold back piston 35, operates to shift said piston to its left hand position, so that the valve 37 is lifted from its seat, permitting the further flow of fluid from the auxiliary reservoir through the large port opening created by the opening of valve 37 as well as through the restricted port 96.

On cars at the rear end of the train, the by-pass valve device D will be in its left hand position when an emergency application is made, since the selector valve device C on the cars at the rear does not move to its retarded release position, and since the piston chamber 32 of the by-pass valve device is therefore maintained charged with fluid under pressure, as hereinbefore described. As a consequence, when an emergency application of the brakes is made, fluid will flow from the auxiliary reservoir to passage 95 on the rear cars as well as on the cars at the head of the train, but since the by-pass valve device D is in its left hand position, fluid can flow from the auxiliary reservoir through passage 95 and thence through cavity 100 in slide valve 33 to passage 98, and as the cavity 100 is of large capacity, the brake cylinder will be supplied with fluid from the auxiliary reservoir at a rapid rate, so that the brakes will be applied at the rear end of the train more nearly simultaneously with the application of the brakes at the head end of the train, thus preventing the slack from running in so as to cause undue shock.

In an emergency application, whether located at the rear or head of the train, the emergency piston 40 is operated by the fluid supplied from the auxiliary reservoir through piston chamber 41 to the brake cylinder, so that the emergency vent valve 38 is opened to vent fluid from the brake pipe to the brake cylinder to produce quick serial action in the well known manner.

By employing a relay valve device controlled by the main triple valve portion, the main slide valve 7 may be made of relatively small area, with relatively small areas exposed to atmospheric pressure and thus the main valve offers very little resistance to movement by the piston 3, said piston being of relatively large area, so as to still further increase the responsiveness of the triple valve portion to changes in fluid pressure. On the other hand, the application and the release resistance devices provide means for more positively defining the operating positions of the triple valve device, so as to more certainly ensure that the equalizing piston 3 will not move to emergency position when a service reduction in brake pipe pressure is made and furthermore, the resistance device 46 prevents movement of the slide valve 7 from service lap to release position, at the same time dispensing with the usual separate graduating valve.

Having now described my invention, what I claim as new and desire to secure by Letters Patent, is:—

1. In a fluid pressure brake, the combination with a brake pipe, of an equalizing valve device operated upon a reduction in brake pipe pressure for effecting a service application of the brakes and a yielding stop for defining the service lap position of said valve device.

2. In a fluid pressure brake, the combination with a brake pipe, of an equalizing valve device operated upon a reduction in brake pipe pressure for effecting a service application of the brakes and a stop for yieldingly preventing movement of said valve device from service lap position toward release position.

3. In a fluid pressure brake, the combination with a brake pipe, of an equalizing valve device operated upon a reduction in brake pipe pressure for effecting a service application of the brakes and a stop for defining the service lap position of said valve device, and means operative upon applying the brakes for projecting said stop to the position for defining the service lap position.

4. In a fluid pressure brake, the combination with a brake pipe, of an equalizing valve device subject to variations in brake pipe pressure and having a service application position, a service lap position, and a release position and a yielding stop for preventing movement of said valve device from service lap position toward the release position.

5. In a fluid pressure brake, the combination with a brake pipe, auxiliary reservoir, and brake cylinder, of a piston subject to the opposing pressures of the brake pipe and auxiliary reservoir, a valve movable by said piston to service position upon a reduction in brake pipe pressure for supplying fluid from the auxiliary reservoir to the brake cylinder, and a yielding stop for opposing movement of said valve from service lap position toward release position.

6. In a fluid pressure brake, the combination with a brake pipe and brake cylinder, of a piston subject to variations in brake pipe pressure, a valve operated by said piston for supplying fluid to the brake cylinder, a yielding stop, and means controlled by said valve for supplying fluid under pressure to said stop to project same into a position for opposing movement of said valve toward release position.

7. In a fluid pressure brake, the combination with a brake pipe, of an equalizing valve device operated by variations in brake pipe pressure for controlling the application and release of the brakes, an application resistance device for opposing movement of said valve device to application position, and a release resistance device for opposing movement of said valve device from application position to release position.

8. In a fluid pressure brake, the combination with a brake pipe and brake cylinder, of a relay valve device for controlling communication through which fluid is supplied to the brake cylinder in an emergency application, a selector valve device for also controlling said communication, and an equalizing valve device subject to variations in brake pipe pressure for controlling the operation of said relay valve device and said selector valve device.

9. In a fluid pressure brake, the combination with a brake pipe and brake cylinder, of a relay valve device for controlling communication through which fluid is supplied to the brake cylinder in an emergency application, a selector valve device for also controlling said communication, and having a full release position and a position in which the release of fluid from the brake cylinder is restricted, and an equalizing valve device subject to variations in brake pipe pressure for controlling the operation of said relay and selector valve devices.

10. In a fluid pressure brake, the combination with a brake pipe and brake cylinder, of a selector valve device for controlling communication through which fluid is supplied to the brake cylinder in an emergency application and having a full release position and a position in which the release of fluid from the brake cylinder is restricted and an equalizing valve device subject to variations in brake pipe pressure for controlling the operation of said selector valve device.

11. In a fluid pressure brake, the combination with a brake pipe and brake cylinder, of a by-pass valve device having a position in which the flow of fluid to the brake cylinder in an emergency application is restricted and a position in which said flow is at a greater rate and a selector valve device for controlling the operation of said by-pass valve device and having a full release position and a position in which the release of fluid from the brake cylinder is restricted.

12. In a fluid pressure brake, the combination with a brake pipe and brake cylinder, of a by-pass valve device having a position in which the flow of fluid to the brake cylinder in an emergency application is restricted and a position in which said flow is at a greater rate and a selector valve device having a full release position and a position in which the release of fluid from the brake cylinder is restricted, the selector valve device being operative in its restricted release position to effect the movement of said by-pass valve device to its position for restricting the flow of fluid to the brake cylinder in an emergency application.

13. In a fluid pressure brake, the combination with a brake pipe, of an equalizing valve device subject to variations in brake pipe pressure, a relay valve device operated upon movement of the equalizing valve device when the brake pipe pressure is reduced to effect a service application of the brakes, and means for locally venting fluid from the brake pipe upon movement of said relay valve device to effect a service application of the brakes.

14. In a fluid pressure brake, the combination with a brake pipe, brake cylinder, and auxiliary reservoir, of an equalizing valve device subject to variations in brake pipe pressure and operated upon a gradual reduction in brake pipe pressure for supplying fluid from the auxiliary reservoir to the brake cylinder, a relay valve device controlled by said equalizing valve device for controlling communication through which fluid is released from the brake cylinder, and communication through which fluid is supplied from the auxiliary reservoir to the brake cylinder in an emergency application of the brakes.

15. In a fluid pressure brake, the combination with a brake pipe and brake cylinder, of an equalizing valve device subject to variations in brake pipe pressure and having an emergency application position and a retarded release position, a selector valve device having a full release position and a position in which the release of fluid from the brake cylinder is restricted, and means controlled by said equalizing valve device for effecting the movement of said selector valve device to its position for restricting the release of fluid from the brake cylinder both in the emergency application and the retarded release positions of said equalizing valve device.

16. In a fluid pressure brake, the combination with a brake pipe, of an equalizing valve device subject to variations in brake pipe pressure and having a service application position and a service lap position, a relay valve device controlled by said equalizing valve device and having a service application position and a release position, and a yielding stop operable by fluid under pressure supplied to said relay valve device in service application position for engaging said equalizing valve device in service lap position.

17. In a fluid pressure brake, the combination with a brake cylinder, of a valve for controlling a communication through which fluid is supplied to the brake cylinder in an emergency application of the brakes and operating means for said valve comprising differential piston heads operable by variations in fluid pressure.

18. In a fluid pressure brake, the combination with a brake cylinder, a brake pipe, and an equalizing valve device subject to variations in fluid pressure for controlling the brakes, of a relay valve device and a selector valve device controlled by said equalizing valve device, a valve for controlling a communication through which fluid is supplied to the brake cylinder in an emergency application of the brakes, differential piston heads for operating said valve, means controlled by said relay valve device for varying the fluid pressure on one piston head, and means controlled by the selector valve device for varying the fluid pressure on the other piston head.

In testimony whereof I have hereunto set my hand.

CLYDE C. FARMER.